United States Patent Office 3,301,035
Patented Jan. 31, 1967

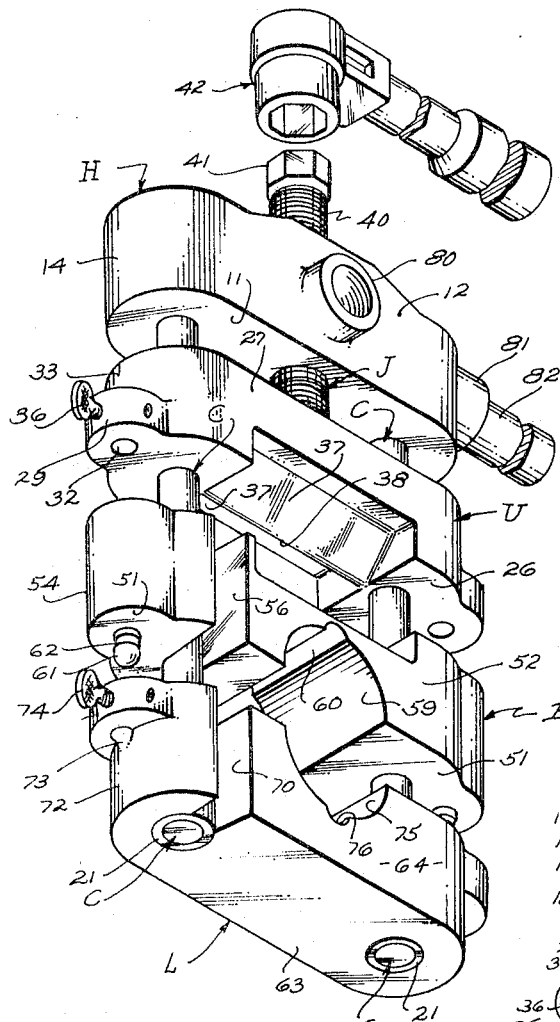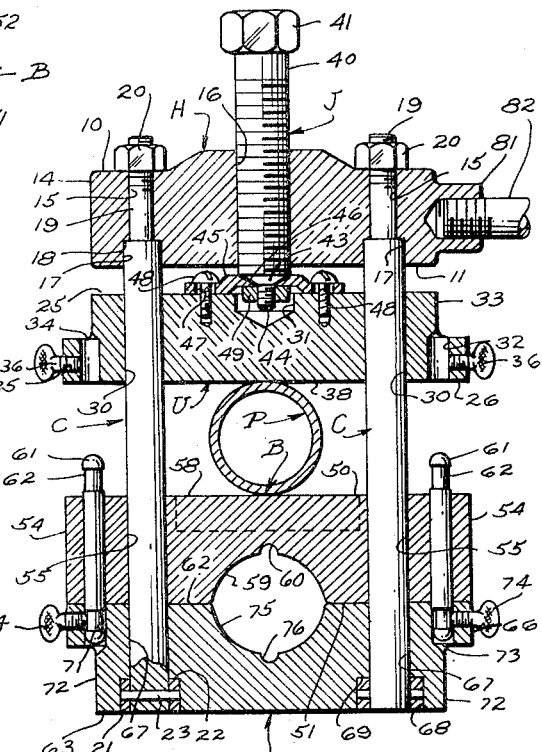

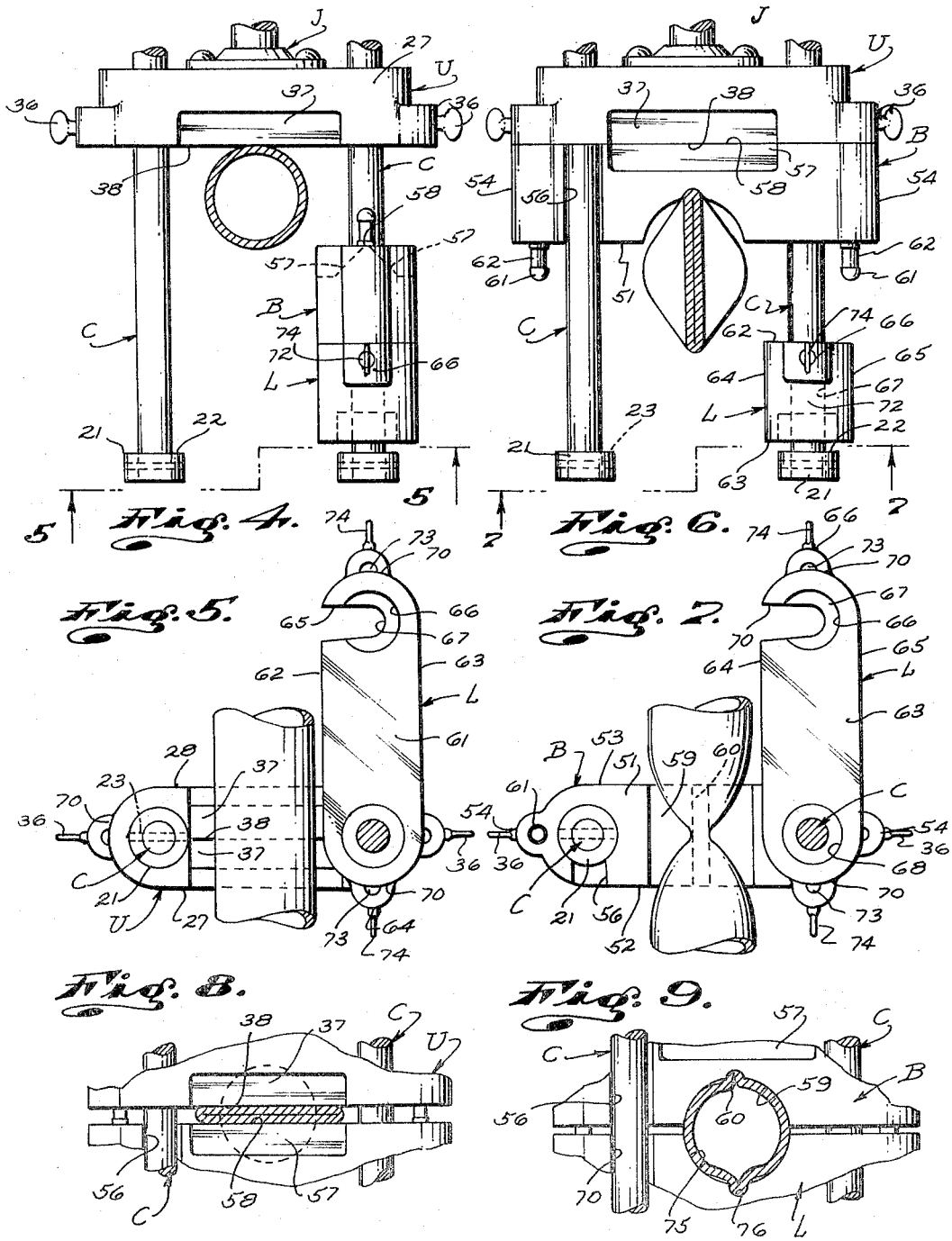

3,301,035
SHUT-OFF TOOL
John B. Gill, c/o Pilot Mfg. Co., P.O. Box 2127,
Torrance, Calif. 90503
Filed June 29, 1964, Ser. No. 378,662
17 Claims. (Cl. 72—404)

This invention relates to an improved shut-off tool and is more particularly concerned with that class of tool employed to shut off flow through a deformable pipe or tube by collapsing or pinching said tube, and for subsequently reestablishing flow through said tube by working and urging it back towards its original configuration.

In the art of handling fluids and gases, there is an ever increasing use of seamless pipe or tubing which is established of relatively soft malleable plastic, metal or alloy, such as soft copper. The advantages provided in the use of such piping and/or tubing are manifold and are believed to be sufficiently obvious and well known as to warrant but a cursory consideration thereof.

One advantage to be found in the use of deformable piping and/or tubing, which is not well known but which is becoming better known and is being utilized at an ever increasing rate, is the ability of such piping and/or tubing to be collapsed or pinched so as to shut off flow therethrough and to be subsequently reformed to reestablish flow therethrough. The ability of such flow conductors to be so worked makes it possible to eliminate the provision of certain valves, and the like, which are costly and seldom used, and makes it possible to interrupt or shut off flow through a conductor at any desired point along its longitudinal extent.

It has been found and clearly established that the ordinary soft copper tube can be pinched or collapsed along a line normal to its central longitudinal axis so as to effectively shut off the flow therethrough and without cracking, grazing, or otherwise adversely affecting the tube structure so that it will rupture or otherwise fail.

Further, it has been found and clearly established that by the application and proper distribution of suitable opposing, outside forces, at the opposite ends of the line along which a copper tube has been collapsed and pinched off, in the manner set forth above, the tube can be urged open again to an extent where substantially full and free flow is reestablished therethrough.

While a tube once closed in the manner set forth above can seldom, if ever, be returned to its original configuration by the application of external forces alone, it can readily be returned to a condition which is such that it allows for greater flow, or presents less obstruction or resistance to flow than that which is provided or presented by an ordinary valving structure.

In accordance with the above, the prior art has provided especially designed shut-off tools which are operable to collapse or pinch and thereby shut off flow through deformable pipes and tubes, and which are operable to subsequently act upon and reform the collapsed pipe or tube so as to open it up and reestablish flow therethrough.

The tools of the character referred to above have been characterized by C-shaped frames which are such that they can be easily and conveniently arranged about a pipe or tube with portions thereof at diametrically opposite sides of the pipe or tube. These structures further include two pairs of interchangeable dies; that is, a pair of closing dies and a pair of opening dies. Each pair of dies includes a stationary die carried by the frame to occur at one side of the pipe or tube and a movable die to occur at the other or opposite side of the pipe or tube and carried by a suitable jack means related to the frame. The jack means is operable to urge the movable die toward and away from the tube and the fixed die. The jack means normally employed are simple, manually operable, screw type jack means.

From the foregoing, it will be apparent that the ordinary shut-off tool provided by the prior art is essentially little more than a modified C-clamp.

The closing dies in shut-off tools of the character herein referred to present two straight elongate parallel and opposing tube-engaging edges or die surfaces, which edges or surfaces must remain in unyielding parallel relationship when they are urged into tight clamping and forming engagement with a pipe or tube.

It has been found that the ordinary C-type frame is satisfactory for small diameter copper tubing, for example, tubing up to 1″ in diameter, but is not satisfactory for larger size tubing as the frame must then be beefed-up to such an extent, to gain sufficient rigidity, that it becomes excessively heavy and excessively bulky and awkward to handle and manipulate.

Still further, the forces exerted at or during the last phase of the closing operation, that is, when the flow through the tube being acted upon is finally shut off, is oftentimes substantial, and may be such as to spring the ordinary C-type frame, rendering the entire tool ineffective.

Another shortcoming in the shut-off tools provided by the prior art resides in the fact that there is no means for limiting the force that can be exerted onto and through the constructions by the operators thereof. That is, the operators are free to manually exert, unchecked, brute force which results in cutting of the tubes or pipes being worked upon, damage to the dies and breakage or damage to the remainder of the constructions.

An object of my invention is to provide a shut-off tool construction for use on large diameter pipe which is lighter in weight and smaller in size than C-clamp type shut-off tools for large diameter pipes, the frame of which must be made quite large and heavy to withstand the forces encountered.

An object of my invention is to provide an improved shut-off tool of the character referred to, adapted for use on large diameter pipes, which tool is not subject to becoming sprung, misaligned, or otherwise rendered defective or inoperative by the application of heavy or excessive forces therethrough.

Another object of my invention is to provide a tool of the character referred to having novel release means to prevent the exertion of excessive forces therethrough.

Still another object of the present invention is to provide a tool of the character referred to which is not subject to becoming displaced from engagement with a tube or pipe with which it is related and which is therefore not subject to becoming lost or misaligned.

In simple forms of ordinary shut-off tools of the character referred to, there is provided two interchangeable pairs of dies, that is, a pair of closing dies and a pair of opening dies, each of which must be removed and replaced by the other pair when it is desired to use said other pair. Such a set-up is extremely undesirable, as it necessitates the provision of a multiplicity of separable, easy to lose and misplace parts and necessitates manual manipulation of such parts which is time consuming, troublesome, and to a great degree, uncertain.

In more sophisticated shut-off tools of the character referred to, rotating or cylinder type multiple die heads have been provided. Such constructions have eliminated the problem of losing parts and have made operation more convenient and less time-consuming. However, such structures have sacrificed simplicity and require heavier frames to support the dies, with the result that most of their advantages are lost, particularly in large tools for large diameter pipe and tubes, where weight of the tool becomes more critical for its practical use.

An object of the present invention is to provide a shut-off tool of the general character referred to wherein the dies are embodied in three rugged and simple members which are permanently related to the construction and are not subject to being displaced and lost, and which are easy and convenient to shift between positions for opening and closing a deformable pipe or tube.

Another object of my invention is to provide a tool of the character referred to which is rugged, durable, easy and economical to manufacture and maintain, and which is easy to operate and highly effective and dependable in operation.

The various objects and features of my invention will be more fully understood from the following detailed description of a typical preferred form and application of my invention, throughout which description reference is made to the accompanying drawings, in which:

FIG. 1 is an isometric view showing the front, bottom and one side of my new tool;

FIG. 2 is a transverse sectional view of the construction that I provide;

FIG. 3 is a front elevational view of a portion of my new tool showing parts thereof in one position;

FIG. 4 is a view similar to FIG. 3 with the parts in another position;

FIG. 5 is a bottom end view taken as indicated by line 5—5 on FIG. 4;

FIG. 6 is a view similar to FIGS. 3 and 4, showing the parts in yet another position;

FIG. 7 is a view taken as indicated by line 7—7 on FIG. 6;

FIG. 8 is a view of a portion of my new tool with certain parts in other positions; and, FIG. 9 is a view of a portion of my new tool with certain other parts in other positions.

The structure provided by the present invention includes, generally, an elongate, horizontally disposed header H, a pair of elongate vertically disposed columns C fixed to the header H in longitudinal spaced relationship and depending therefrom in lateral spaced parallel relationship, an elongate horizontally disposed upper forming block U below the header and slidably engaged on the columns, jack means J carried by the header and engaged with the forming block U and operable to shift the forming block U vertically relative to the header and the columns, an elongate horizontally disposed lower forming block L below the upper forming block U and shiftably related to the columns, and an elongate horizontally disposed intermediate or central forming block B between the upper and lower forming blocks and shiftably related to the columns.

In addition to the foregoing, the construction includes releasable coupling means D to selectively and releasably secure the central forming block B to the upper and lower forming blocks U and L.

The header H is an elongate horizontally disposed casting having top and bottom surfaces 10 and 11, front and rear surfaces 12 and 13, and oppositely disposed ends 14. The header H extends transverse the central longitudinal vertical plane of the construction and is provided with a pair of laterally spaced column-receiving openings 15 extending vertically therethrough, between the top and bottom surfaces 10 and 11, and a central jack receiving opening 16 extending vertically therethrough.

The openings 15 are provided with counterbores 17 entering the lower surface 11 of the header and terminating at downwardly disposed stop shoulders 18.

The opening 16 is internally threaded, as indicated in the drawings.

In practice, if circumstances require, as when the header is cast of aluminum or other soft metal, the opening 16 can be provided with a suitable threaded bushing or the like, with departing from the spirit of this invention.

While I have described the header as being cubical in form, it will be noted from the drawings that it is provided with enlarged and reduced portions, and the like, in order to provide it with maximum strength for weight of material employed. Since the exact configuration of the header can, for the purpose set forth above, be varied considerably without affecting the novelty of this invention, I have not and will not burden this specification with further detailed description thereof.

The columns C are simple, elongate, laterally spaced and vertically disposed cylindrical, steel bars having upper ends slidably engaged in the counterbores 17 and stopped against the shoulders 18 is the header H.

The columns C are provided with threaded extensions 19 of reduced diameter, at their upper ends, which extensions project through the openings 15 and carry suitable nuts 20, which nuts engage the top surface 10 of the header.

It will be apparent that the extensions 19 and nuts 20 serve to hold the column C in fixed relationship with the header.

The lower ends of the column C are provided with annular stop collars or sleeves 21, which collars define upwardly disposed annular stop shoulders 22.

The collars 21 are fixed to the columns C by means of shear pins 23, which pins will shear upon the exertion of excessive downward pressure on the collars, when the construction is operated, as will hereinafter be described.

The upper forming block U that I provide is essentially an elongate rectangular casting arranged in parallel relationship below the header H.

The block U has top and bottom surfaces 25 and 26, front and rear surfaces 27 and 28, and ends 29.

The block U is provided with a pair of laterally spaced openings 30 through which the columns C are slidably engaged, a central upwardly opening socket 31 in its upper surface 25, a pair of vertically disposed downwardly opening guide pin-receiving sockets 32 entering its lower surface 26 and arranged to occur laterally outward of the columns C.

The sockets 32 are adapted to slidably receive guide pins of the means D, as will hereinafter be described.

The upper block U is suitably relieved at each end, as indicated at 33, to remove excess material and weight and to establish an exhaust port 34 at the bottom of each socket 32 and so that foreign matter which becomes lodged in the sockets 32 will not prevent engagement of the guide pins therein, but will be exhausted through the ports 34 when guide pins are entered into the sockets.

In addition to the foregoing, the upper block U is provided with laterally outwardly opening threaded openings 35 communicating with the sockets 32 and in which guide pin-engaging set screw fasteners 36 are threadedly engaged. In the preferred carrying out of the invention, the fasteners 36 are thumb screws and are provided with channels or undercuts (not shown) in their shanks, in which Allen head retaining fasteners 36' are entered to prevent displacement of the fasteners 36.

The lower central portion of the upper block U, between the openings 30 and the columns C, is relieved to define a pair of downwardly and inwardly convergent surfaces 37. The lower portions of the surfaces 37 are turned inwardly towards each other to define a rounded elongate transversely extending tube-engaging die surface or forming edge 38, the lowermost portion or side of which is flush and parallel with the bottom 27 of the block.

The upper block U, with its straight transversely extending tube-engaging forming edge or die surface 38 is, in essence, a vertically shiftable closing die, carried by the columns C.

The jack means J includes an elongate vertically disposed cylindrical, externally threaded shaft or screw member 40, which member is threadedly engaged in and through the opening 16 in the header H.

The upper end of the screw member 40 projects upwardly from the header H and is provided with a polygonal head 41 to facilitate the establishment of driving engagement between the screw member and a suitable operating tool, such as a ratchet wrench 42.

The lower end of the screw member projects downwardly from the header H and is provided with a downwardly convergent surface or centering cone 43 and a depending threaded extension 44 of reduced diameter.

A flat coupler plate 45 with a central downwardly convergent or conical seat opening 46 and a pair of laterally spaced fastener receiving openings 47 is secured to the top surface 25 of the block U, by means of screw fasteners 48 engaged through the openings 47 and into the block. The plate is arranged to overlie the socket 31 in the block, with the opening 46 thereof communicating with said socket.

The cone 43 of the screw member establishes sliding seated engagement in the seat opening 46 in the plate 45 and the extension 44 on the screw member depends below the plate and into the socket 31. A retainer nut 49 is engaged on the extension 44 to establish sliding bearing engagement on the bottom surface of the plate and to prevent separation of the screw member from the plate.

The openings 47 are of greater diametric extent than the shanks of the screw fasteners 48. With this relationship of parts, the plate 45 remains centered with the screw member at all times and can be shifted relative to the top surface of the block U and the socket 31 therein to adjust for and/or compensate for possible misalignment of the several parts.

The lower end of the screw member with its centering cone and extension, the plate 25 with its related screw fasteners 48 and the nut 49, cooperate to establish self-centering coupling means for and between the screw member or jack means and the upper forming block.

The central forming block D is an elongated rectangular, block-like member having flat top and bottom surfaces 50 and 51, front and rear surfaces 52 and 53 and ends 54.

The central forming block D is provided with a pair of laterally spaced vertical openings 55 and is arranged in parallel relationship below the upper forming block U and is slidably engaged on the columns C. That is, the columns C are slidably engaged through the openings 55.

The left end portion of the block B, looking at the front surface thereof, is provided with a forwardly opening, elongate, vertically extending, column receiving access slot 46, which slot communicates with the opening 55 at said left end of the block.

With this construction, it will be apparent that the block B can be pivoted or swung rearwardly and to the right about the column C at the right side of the construction and into and out of engagement with the column C at the left side of the construction.

The upper central portion of the block B is relieved to define a pair of upwardly convergent surfaces 57, the upper edge portions of which are turned inwardly toward each other to define an elongate, horizontal, transversely extending, rounded, lower tube-engaging forming edge or die surface 58, which edge or die surface is parallel with the top surface 50 of the block and is parallel with and is in the same vertical plane as the forming edge or die surface 58, which edge or die surface is parallel with the top surface 50 of the block and is parallel with and is in the same vertical plane as the forming edge or die surface 38 on the upper forming block U, which it opposes.

The lower central portion of the block B is provided with a downwardly opening semi-circular forming recess or die surface 59, the axis of which extends parallel with the central axis of the construction and which is normal to the major longitudinal axis of the block and the axes of the forming surfaces 38 and 58.

The forming recess or die surface 59 opens at the front and rear surfaces 52 and 53 of the block B and is provided at its upper center with an axially extending, downwardly opening centering recess 60.

The forming recess or die surface 59 is adapted to reform a tube which has been deformed and closed by and between the forming edges or die surfaces 38 and 58 of the construction as will hereinafter be described.

In addition to the foregoing, the block B is provided with a pair of laterally spaced guide pins 61 in its end portions, laterally outward of the openings 55 and the columns C.

The guide pins 61 have upper and lower end portions that project upwardly and downwardly from the block and which are provided with radially outwardly opening annular recesses or grooves 62 to cooperatively receive lock fasteners carried by the blocks in which they are engaged.

The upper portions of the guide pins 61 are adapted to be selectively engaged in the sockets 32 in the upper forming block U. When thus engaged, the lock fasteners or set screws 36 can be advanced into engagement into the grooves 62 to releasably secure the blocks U and B together and in assembled or unitized relationship.

From the foregoing, it will be apparent that the central forming block B is a multiple or dual purpose die member having two separate and distinct die surfaces. That is, it has forming surfaces or die surfaces for closing and for opening a pipe or duct and functions or is utilized during both the closing and opening operations for which the tool is designed.

The lower forming block L is an elongate rectangular casting having flat top and bottom surfaces 62 and 63, front and rear surfaces 64 and 65 and ends 66. The block L, like the blocks U and B is provided with a pair of laterally spaced vertical openings 67 and is arranged in parallel relationship with and below the said other blocks and in sliding engagement with or on the columns C, which columns extend through the openings 67.

The openings 67 are provided with enlarged counterbores 68 opening at the bottom surface 63 of the block, which counterbores terminate in the block to define downwardly disposed annular stop shoulders 69. The sockets 68 cooperatively receive the stop collars 21 on the columns so that the shoulders 22 and 69 normally establish stopped butted engagement with each other and prevent downward shifting and displacement of the block L relative to or from the columns C.

It will be noted that the block L can be shifted vertically relative to the columns C and away from engagement with the sleeves 21 thereon.

The block L, like the block B, is provided with an elongate, vertically extending, forwardly opening, column receiving access slot 70 in its forward left-hand portion, which slot communicates with the opening 67. The column C related to the slot 70 is free to shift therethrough and into and out of engagement with the related opening 67.

The slot 70 is of uniform lateral extent throughout its entire vertical extent and where it communicates with the socket 68 the slot 70 is less in lateral extent or width than the diametric extent of the socket 68 and the stop sleeve or collar 21. Accordingly, the collar 21 cannot shift through the slot and normally acts as a stop to prevent pivoting and lateral displacement of the forming block L from the left-hand column C.

It will be apparent, however, that upon shifting the block L upwardly relative to the columns C and out of engagement with the collars 21, it can be freely pivoted rearwardly and to the right, about the right-hand column and out of engagement with the left-hand column.

When the block L is so pivoted, full and free access between the column C, at the lower portion thereof, is established and so that the construction can be freely arranged with a pipe or duct P, with said pipe or duct extending horizontally and longitudinally between the columns and adjacent the lower or bottom side of the block U or block D, as illustrated in FIGS. 4 through 7 of the drawings.

When the construction is thus arranged with the pipe P, the lower forming block L is swung and shifted back to its normal position where it engages both of the columns C and their related stop collars 21. When the construction is thus oriented, the pipe P is arranged in captive relationship within the tool and accidental displacement of the pipe and tool cannot occur.

In addition to the foregoing, the block L is provided with a pair of upwardly opening guide pin receiving sockets 71 in its top surface 62, laterally outward of the openings 67 and in axial alignment with the lower end portions of the guide pins 61, depending from the central forming block B and into which said guide pins are adapted to slidably enter, when the bottom surface 51 of the block B is urged into engagement with the opposing top surface 62 of the block L.

The block L, like the block U, is relieved at its ends, as indicated at 72, so as to reduce the weight of the block and to establish exhaust ports 73 communicating with the bottom of the guide-pin receiving sockets 71.

The block L carries suitable set screws 74 to engage in the guide pins 61 and to selectively maintain the pins 61 engaged in the sockets 71 and the related blocks L and B in unitized or assembled relationship. Set screws 74, like the screws 36, are retained from displacement by retaining fasteners 74'.

The upper central portion of the lower forming block L is provided with an upwardly opening semi-circular forming recess or die surface 75. The die surface 75 opposes the die surface 59 in the lower central portion of the center forming block B and cooperates therewith to establish a complate forming die for opening up and reestablishing flow through a pipe P that has been previously collapsed and closed by the closing die or dies.

The die surface 75 is also provided with a central upwardly opening semi-circular, longitudinally extending, centering notch 76, which notch is similar to the notch 60 in the die surface 59 of the block B and in which an edge of the collapsed and closed pipe or duct is engaged.

In operation, the block B is selectively cooperatively related to either the upper forming block U, as illustrated in FIGS. 3, 6 and 7, or the lower forming block L, as illustrated in FIGS. 2, 4 and 5, and is properly oriented therewith by means of the guide pins 61 and is retained in engagement therewith by means of the lock fasteners.

When it is desired to collapse and close the pipe P, the block B is coupled with the block L. The coupled blocks L and B are shifted upwardly so as to release the block L from engagement with the stop collars 21. The blocks are then swung rearwardly and to the right so as to open the space between the lower end portions of the columns C.

The columns C are then engaged about the pipe P and the tool is shifted so as to bring the die surface or edge 38 on the upper forming block U into engagement with the pipe. The united or coupled blocks B and L are then swung and shifted back to their normal position and in locked engagement with the two columns and their related stop collars 21. The jack means J is then operated, by means of the wrench 42, or other suitable means, to advance the block U downwardly toward the block B. As the block U is thus advanced, the pipe P is pinched and collapsed, between the opposing die edges or surfaces 38 and 58 and until the flow passage therethrough is shut off, as clearly illustrated in FIGS. 2, 4, 5 and 8 of the drawings.

After the pipe is thus collapsed and closed, the block U is shifted, by operation of the pack means J, away from the block B and the pipe P and the assembled blocks B and L can be shifted and swung away so as to open the construction as set forth above, and the tool T can be removed from engagement about the closed or sealed pipe.

When it is desired to open the collapsed or closed pipe P, the block B is released from assembled relationship with the block L and is shifted and set in assembled relationship with the block U. The block L is again shifted and swung or pivoted so as to open the framework and the construction is shifted and arranged with the pipe P, with one edge of the collapsed portion of the pipe engaged in the notch or recess 60 in the die surface 59 of the block B.

The transverse seal line on the pipe P and along which the edges or die surfaces 38 and 58 of the blocks U and B engage the pipe, is arranged centrally of the notch 60 and as near as possible or practical to the central vertical axis of the construction and of the jack means J.

After the structure is arranged in the manner set forth above, the lower forming block L is returned to its normal, locked position, and the assembled or unitized forming blocks U and B are advanced towards the lower block L by operation of the jack means J and until the other edge of the collapsed portion of the pipe P seats in the notch 76 in the die surface 75 of the said lower block L. Upon subsequent advancement of the blocks B and U towards the block L, the collapsed pipe is subjected to compressive forces exerted at the opposite ends of and normal to the line along which the closing die surfaces engage the pipe, so as to return or reform the pipe towards its original configuration and so that substantially full and free flow therethrough is reestablished.

After the pipe is opened again, in the manner set forth above, the tool is removed in accordance with the same procedure set forth above.

The design of the several die edges and/or surfaces and the manner in which the stock of the pipe is worked, when being closed and when being opened, is well known and is considered in detail in other patents in the art to which this invention pertains. Since such details are subject to certain variations and/or modifications and since they do not materially affect the novelty of the present invention, I will not burden this application with further description thereof.

In practice, and as illustrated in FIGS. 1 and 2 of the drawings, the header H can be provided with longitudinally and laterally opening, internally threaded, annular bosses 80 and 81 in which a suitable elongate handle 82 can be threadedly engaged, to facilitate handling and manipulation of the construction.

In practice, the set screws 36 and 74 need only be provided at the left hand side of the construction, that is on that side of the construction in which the notches or access openings 56 and 70 in the members B and L occur, as the column at the other side of the construction, held captive by the members or blocks B and L, normally suitably retain the blocks B and L in proper orientation.

From the foregoing it will be apparent that I have invented a novel shut-off tool which is rugged and durable, a tool which is easy and economical to manufacture, a tool which is easy, convenient and fool-proof in operation, and a tool which is highly effective and dependable in operation and is not subject to the several shortcomings which characterize the ordinary shut-off tool of the general character referred to and which were recited in the foregoing.

Having described only a typical preferred form and application of my invention, I do not wish to be limited to the specific details herein set forth but wish to reserve to myself any modifications or variations that may appear to those skilled in the art and which fall within the scope of the following claims.

Having described my invention, I claim:

1. A shut-off tool of the character referred to including, a pair of elongate laterally spaced and vertically disposed parallel columns having upper and lower ends, an elongate horizontally disposed header fixed to and extending between the upper ends of the columns, an elongate horizontally disposed upper forming block slidably engaged on and extending between the columns below the header and having a straight elongate downwardly disposed and laterally extending pipe closing die surface between the columns, jack means carried by the header and coupled with the upper forming block and operable to shift the upper forming block vertically, an elongate horizontally disposed central forming block slidably engaged on and extending between the columns below the upper forming block and having a straight, elongate, laterally extending and upwardly disposed pipe closing die surface between the columns and opposing the pipe closing surface on the upper forming block and an elongate downwardly disposed semi-circular pipe opening die surface extending on an axis normal to the vertical lateral plane of the construction and intermediate the columns, and an elongate horizontally disposed lower forming block engaged with and extending between the lower ends of the columns and having an elongate upwardly disposed semi-circular pipe opening die surface extending on an axis normal to the vertical lateral plane of the construction, intermediate the columns and opposing the opening die surface of the central forming block, said central forming block being adapted to be selectively arranged in varying engagement with the lower and the upper forming blocks to cooperatively relate the die surfaces thereof with the opposing die surfaces of said lower and upper forming blocks and with a deformable pipe arranged therebetween, whereby the pipe can be collapsed and closed by the pipe closing die surfaces and can be subsequently reformed and opened by the pipe opening die surfaces.

2. A structure as set forth in claim 1 including, coupling means to selectively releasably couple the central forming block to the upper and to the lower forming block and including guide pins projecting from one of the adjacent blocks, guide pin receiving openings entering the other adjacent block to slidably receive the guide pins and lock screw fasteners carried by said other of the blocks and engageable with said guide pins.

3. A shut-off tool of the character referred to including, a pair of elongate laterally spaced and vertically disposed parallel columns having upper and lower ends, an elongate horizontally disposed header fixed to and extending between the upper ends of the columns, an elongate horizontally disposed upper forming block slidably engaged on and extending between the columns below the header and having a straight elongate downwardly disposed and laterally extending pipe closing die surface between the columns, jack means carried by the header and coupled with the upper forming block and operable to shift the upper forming block vertically, an elongate horizontally disposed central forming block slidably engaged on and extending between the columns below the upper forming block and having a straight, elongate, laterally extending and upwardly disposed pipe closing die surface between the columns and opposing the pipe closing surface on the upper forming block and an elongate downwardly disposed semi-circular pipe opening die surface extending on an axis normal to the vertical lateral plane of the construction and intermediate the columns, and an elongate horizontally disposed lower forming block engaged with an extending between the lower ends of the columns and having an elongate upwardly disposed semi-circular pipe opening die surface extending on an axis normal to the vertical lateral plane of the construction, intermediate the columns and opposing the opening die surface of the central forming block, said central forming block being adapted to be selectively arranged in varying engagement with the lower and the upper forming blocks to cooperatively relate the die surfaces thereof with the opposing die surfaces of said lower and upper forming blocks and with a deformable pipe arranged therebetween, whereby the pipe can be collapsed and closed by the pipe closing die surfaces and can be subsequently reformed and opened by the pipe opening die surfaces, said jack means including an elongate vertically extending screw member threadedly engaged through the header intermediate the ends thereof, a torque tool engaging head at the upper end of the member and self-centering coupling means at and between the lower end of the member and the upper forming block.

4. A structure as set forth in claim 3 including, coupling means to selectively releasably couple the central forming block to the upper and lower forming blocks and including, guide pins projecting from one of the adjacent blocks, guide pin receiving openings entering the other adjacent block to slidably receive the guide pins and lock screw fasteners carried by the said other of the blocks and engageable with said guide pins.

5. A shut-off tool of the character referred to including, a pair of elongate laterally spaced and vertically disposed parallel columns having upper and lower ends, an elongate horizontally disposed header fixed to and extending between the upper ends of the columns, an elongate horizontally disposed upper forming block slidably engaged on and extending between the columns below the header and having a straight elongate downwardly disposed and laterally extending pipe closing die surface between the columns, jack means carried by the header and coupled with the upper forming block and operable to shift the upper forming block vertically, an elongate horizontally disposed central forming block slidably engaged on and extending between the columns below the upper forming block and having a straight, elongate, laterally extending and upwardly disposed pipe closing die surface between the columns and opposing the pipe closing surface on the upper forming block and an elongate downwardly disposed semi-circular pipe opening die surface extending on an axis normal to the vertical lateral plane of the construction and intermediate the columns, and an elongate horizontally disposed lower forming block engaged with and extending between the lower ends of the columns and having an elongate upwardly disposed semi-circular pipe opening die surface extending on an axis normal to the vertical lateral plane of the construction, intermediate the columns and opposing the opening die surface of the central forming block, said central forming block being adapted to be selectively arranged in varying engagement with the lower and the upper forming blocks to cooperatively relate the die surfaces thereof with the opposing die surfaces of said lower and upper forming blocks and with a deformable pipe arranged therebetween, whereby the pipe can be collapsed and closed by the pipe closing die surfaces and can be subsequently reformed and opened by the pipe opening die surfaces, said jack means including an elongate vertically extending screw member threadedly engaged through the header intermediate the ends thereof, a torque tool engaging head at the upper end of the member and self-centering coupling means at and between the lower end of the member and the upper forming block, said self-centering means including, a downwardly convergent centering cone at the lower end of the member and a threaded extension depending from the lower end of the cone, a pressure plate with a central downwardly convergent annular seat slidably receiving the cone and a pair of spaced screw fastener-receiving openings, a retainer nut engaged on the extension to occur below and slidably engage the plate, an upwardly opening socket in the upper forming block and in which the extension and nut are freely arranged, and a pair of screw fasteners having shanks smaller in diameter than the screw fastener-receiving openings in the plate and engaged through said openings in the plate and into the upper forming block to hold the plate in tight clamped engagement on said upper forming block.

6. A structure as set forth in claim 5 including, coupling means to selectively releasably couple the central forming block to the upper and to the lower forming blocks and including, guide pins projecting from one of the adjacent blocks, guide pin receiving openings entering the other adjacent block to slidably receive the guide pins and lock screw fasteners carried by the said other of the blocks and engageable with said guide pins.

7. A shut-off tool of the character referred to including, a pair of elongate laterally spaced and vertically disposed parallel columns having upper and lower ends, an elongate horizontally disposed header fixed to and extending between the upper ends of the columns, an elongate horizontally disposed upper forming block slidably engaged on and extending between the columns below the header and having a straight elongate, laterally extending and downwardly disposed pipe closing die surface between the columns, jack means carried by the header and coupled with the upper forming block and operable to shift the block vertically, an elongate horizontally disposed central forming block pivotally and slidably engaged with and carried by one of the columns and releasably engageable with the other column to establish sliding engagement therewith, said central forming block having a straight, elgonate, laterally extending and upwardly disposed pipe closing die surface normally opposing the pipe closing die surface of said upper forming block and an elongate downwardly disposed semi-circular pipe opening die surface extending on an axis normal to the vertical lateral plane of the construction and normally intermediate the columns, and an elongate horizontally disposed lower forming block having one end pivotally engaged on the lower end of said one column and releasably engageable with the other column, said lower forming block having an elongate upwardly disposed semi-circular pipe opening die surface normally opposing and in alignment with the pipe opening die surface of the central forming block, said central and lower forming blocks being adapted to be pivoted relative to said one column and away from said other column to permit selective engagement of a pipe between the central and lower forming blocks, and the central and upper forming blocks, said jack means being operable to selectively urge the upper forming block downwardly toward the central and lower forming blocks and into engagement with a pipe arranged between the upper and central forming blocks downwardly toward the lower forming block and into forming engagement with a pipe arranged between said central and lower forming blocks.

8. A structure as set forth in claim 7 including, coupling means to selectively and releasably couple the central forming block to the upper and lower forming blocks and including guide pins projecting from one of the adjacent blocks, guide pin receiving openings entering the other adjacent block to slidably receive the guide pins and lock screw fasteners carried by the said other of the blocks and engageable with said guide pins.

9. A shut-off tool of the character referred to including, a pair of elongated laterally spaced and vertically disposed parallel columns having upper and lower ends, an elongate horizontally disposed header fixed to and extending between the upper ends of the columns, an elongate horizontally disposed upper forming block slidably engaged on and extending between the columns below the header and having a straight, elongate, laterally extending and downwardly disposed pipe closing die surface between the columns, jack means carried by the header and coupled with the upper forming block and operable to shift the block vertically, an elongate, horizontally disposed central forming block pivotally and slidably engaged with and carried by one of the columns and releasably engageable with the other column to establish sliding engagement therewith, said central forming block having a straight elongate, laterally extending and upwardly disposed pipe closing die surface normally opposing the pipe closing die surface of said upper forming block and an elongate downwardly disposed semi-circular pipe opening die surface extending on an axis normal to the vertical lateral plane of the construction and normally intermediate the columns, and an elongate, horizontally disposed lower forming block having one end pivotally engaged on the lower end of said one column and releasably engageable with the other column, said lower forming block having an elongate upwardly disposed semi-circular pipe opening die surface normally opposing and in alignment with the pipe opening die surface of the central forming block, said central and lower forming blocks being adapted to be pivoted relative to said one column and away from said other column to permit selective engagement of a pipe between the central and lower forming blocks, and the central and upper forming blocks, said jack means being operable to selectively urge the upper forming block downwardly toward the central and lower forming blocks and into engagement with a pipe arranged between the upper and central forming blocks and to urge the upper and central forming blocks downwardly toward the lower forming block and into forming engagement with a pipe arranged between said central and lower forming blocks, said jack means including, an elongate vertically extending screw member threadably engaged through the header intermediate the ends thereof, a torque tool-engaging head at the upper end of the member and self-centering coupling means at and between the lower end of the member and the upper forming block.

10. A structure as set forth in claim 9 including coupling means to selectively releasably couple the central forming block to the upper and lower forming blocks, including guide pins projecting from one of the adjacent blocks, guide pin receiving openings entering the other adjacent block to slidably receive the guide pins and lock screw fasteners carried by the said other of the blocks and engageable with said guide pins.

11. A shut-off tool of the character referred to including, a pair of elongate laterally spaced and vertically disposed parallel columns having upper and lower ends, an elongate horizontally disposed header fixed to and extending between the upper ends of the columns, an elongate horizontally disposed upper forming block slidably engaged on and extending between the columns below the header and having a straight elongate, laterally extending and downwardly disposed pipe closing die surface between the columns, jack means carried by the header and coupled with the upper forming block and operable to shift the block vertically, an elongate horizontally disposed central forming block pivotally and slidably engaged with and carried by one of the columns and releasably engageable with the other column to establish sliding engagement therewith, said central forming block having a straight elongate, laterally extending and upwardly disposed pipe closing die surface normally opposing the pipe closing die surface of said upper forming block and an elongate downwardly disposed semi-circular pipe opening die surface extending on an axis normal to the vertical lateral plane of the construction and normally intermediate the columns, and an elongate horizontally disposed lower forming block having one end pivotally engaged on the lower end of said one column and releasably engageable with the other column, said lower forming block having an elongate upwardly disposed semi-circular pipe opening die surface normally opposing and in alignment with the pipe opening die surface of the central forming block, said central and lower forming blocks being adapted to be pivoted relative to said one column and away from said other column to permit selective engagement of a pipe between the central and lower forming blocks, and the central and upper forming blocks, said jack means being operable to selectively urge the upper forming block downwardly towards the central and lower forming blocks and into engagement with a pipe arranged between the upper and central forming blocks and to urge the upper and central forming blocks downwardly toward the lower forming block and into forming engagement with a pipe arranged between said central and lower forming blocks, said jack means including, an elongate vertically extending screw member threadably engaged through the header intermediate the ends thereof, a torque tool engaging head at the upper end of the member and self-centering coupling means at and between the lower end of the member and the upper forming block, said self-centering means including a downwardly convergent centering cone at the lower end of the member and a threaded extension depending from the lower end of the cone, a pressure plate with a central downwardly convergent annular seat slidably receiving the cone and a pair of laterally spaced screw fastener receiving openings, a retainer nut engaged on the extension to occur below and slidably engage the plate, an upwardly opening socket in the upper forming block and in which the extension and nut are freely arranged and a pair of screw fasteners having shanks smaller in diameter than the screw fastener receiving openings and engaged through said openings and into the upper forming block to hold the plate in tight clamped engagement on said upper forming block.

12. A shut-off tool of the character referred to including, a pair of elongate laterally spaced and vertically disposed parallel columns having upper and lower ends, an elongate horizontally disposed header fixed to and extending between the upper ends of the columns, enlargements on the lower ends of the columns, an elongate horizontally disposed upper forming block slidably engaged on and extending between the columns below the header and having a straight elongate laterally extending and downwardly disposed pipe closing die surface between the columns, jack means carried by the header and coupled with the upper forming head and operable to shift the forming block vertically, an elongate horizontally disposed central forming block with an elongate vertical opening at one end portion pivotally and slidably receiving one of the columns and an elongate vertically extending laterally opening notch at its other end portion to releasably receive the other column to establish sliding engagement therewith, said central forming block having a straight elongate, laterally extending and upwardly disposed pipe-closing die surface normally opposing the pipe closing die surface of said upper forming block and an elongate downwardly disposed semi-circular pipe opening die surface extending on an axis normal to the vertical lateral plane of the construction and normally intermediate the columns, and an elongate horizontally disposed lower forming block with an elongate vertical opening at one end portion pivotally receiving the lower end of said one column and an elongate laterally opening vertically extending column receiving notch at its other end portion to releasably receive the other column, said lower forming block normally engaging and stopped against the enlargements on the lower ends of the columns and having an elongate upwardly disposed semi-circular pipe opening die surface normally opposing and in alignment with the pipe opening die surface of the central forming block, said central and lower forming blocks being adapted to be pivotally related to the said one column and away from said other column to permit selective engagement of a pipe between the central and lower forming blocks, and the central and upper forming blocks, said jack means being operable to selectively urge the upper forming block downwardly towards the central forming block and into engagement with a pipe arranged therebetween or to urge the upper and central forming blocks downwardly towards the lower forming block and into forming engagement with a pipe arranged therebetween.

13. A shut-off tool of the character referred to including, a pair of elongate laterally spaced and vertically disposed parallel columns having upper and lower ends, an elongate horizontally disposed header fixed to and extending between the upper ends of the columns, enlargements on the lower ends of the columns, an elongate horizontally disposed upper forming block slidably engaged on and extending between the columns below the header and having a straight elongate laterally extending and downwardly disposed pipe closing die surface between the columns, jack means carried by the header and coupled with the upper forming head and operable to shift the forming block vertically, an elongate horizontally disposed central forming block with an elongate vertical opening at one end portion pivotally and slidably receiving one of the columns and an elongate vertically extending laterally opening notch at its other end portion to releasably receive the other column to establish sliding engagement therewith, said central forming block having a straight, elongate, laterally extending and upwardly disposed pipe closing die surface normally opposing the pipe closing die surface of said upper forming block and an elongate downwardly disposed semi-circular pipe opening die surface extending on an axis normal to the vertical lateral plane of the construction and normally intermediate the columns, and an elongate horizontally disposed lower forming block with an elongate vertical opening at one end portion pivotally receiving the lower end of said one column and an elongate laterally opening vertically extending column receiving notch at its other end portion to releasably receive the other column, said lower forming block normally engaging and stopped against the enlargements on the lower ends of the columns and having an elongate upwardly disposed semi-circular pipe opening die surface normally opposing and in alignment with the pipe opening die surface of the central forming block, said central and lower forming blocks being adapted to be pivotally related to the said one column and away from said other column to permit selective engagement of a pipe between the central and lower forming blocks, and the central and upper forming blocks, said jack means being operable to selectively urge the upper forming block downwardly toward the central forming block and into engagement with a pipe arranged therebetween or to urge the upper and central forming blocks downwardly toward the lower forming block and into forming engagement with a pipe arranged therebetween, said jack means including an elongate vertically extending screw member threadedly engaged through the header intermediate the columns, a torque tool engaging head at the upper end of the member and self-centering coupling means at and between the lower end of the member and the upper forming block.

14. A shut-off tool of the character referred to including, a pair of elongate laterally spaced and vertically disposed parallel columns having upper and lower ends, an elongate horizontally disposed header fixed to and extending between the upper ends of the columns, enlargements on the lower ends of the columns, an elongate horizontally disposed upper forming block slidably engaged on and extending between the columns below the header and having a straight elongate laterally extending and downwardly disposed pipe closing die surface between the columns, jack means carried by the header and coupled with the upper forming head and operable to shift the forming block vertically, an elongate, horizontally disposed central forming block with an elongate vertical opening at one end portion pivotally and slidably receiving one of the columns and an elongate vertically extending, laterally opening notch at its other end portion to releasably receive the other column to establish sliding engagement therewith, said central forming block having a straight, elongate, laterally extending and upwardly disposed pipe closing die surface normally opposing the pipe closing die surface of said upper forming block and an elongate downwardly disposed semi-circular pipe opening die surface extending on an axis normal to the vertical lateral plane of the construction and normally intermediate the columns, and an elongate, horizontally disposed lower forming block with an elongate vertical opening at one end portion pivotally receiving the lower end of said one column and an elongate laterally opening vertically extending column receiving notch at its other end portion to releasably receive the other column, said lower forming block normally engaging and stopped against the enlargements on the lower ends of the columns and having an elongate upwardly disposed semi-circular pipe opening die surface normally opposing and in alignment with the pipe opening die surface of the central forming block, said central and lower forming blocks being adapted to be pivotally related to the said one column and away from said other column to permit selective engagement of a pipe between the central and lower forming blocks, and the central and upper forming blocks, said jack means being operable to selectively urge the upper forming block downwardly toward the central forming block and into engagement with a pipe arranged therebetween or to urge the upper and central forming blocks downwardly toward the lower forming block and into forming engagement with a pipe arranged therebetween, said jack means including an elongate vertically extending screw member threadedly engaged through the header intermediate the columns, a torque tool engaging head at the upper end of the member and self-centering coupling means at and between the lower end of the member and the upper forming block, said self-centering means including a downwardly convergent centering cone at the lower end of the member and a threaded extension depending from the lower end of the cone, a pressure plate with a central downwardly convergent annular seat slidably receiving the cone and a pair of spaced screw fastener receiving openings, a retainer nut engaged on the extension to occur below and slidably engage the plate, an upwardly opening socket in the upper forming block and in which the extension and nut are freely arranged, and a pair of screw fasteners having shanks smaller in diameter than the screw fastener receiving openings and engaged through said opening and into the upper forming block and holding the plate in tight clamped engagement on said upper forming block.

15. A structure as set forth in claim 14 including coupling means to selectively releasably couple the central forming block to the upper and to the lower forming blocks and including guide pins projecting from one of the adjacent blocks, guide pin receiving openings entering the other adjacent block to slidably receive the guide pins and lock screw fasteners carried by the said other of the blocks and engageable with said guide pins.

16. A structure as set forth in claim 12 wherein said enlargements on the lower ends of the columns are defined by collars slidably engaged on the columns and releasably secured thereto by shear pins.

17. A structure as set forth in claim 15 wherein said enlargements on the lower ends of the columns are defined by collars slidably engaged on the columns and releasably secured thereto by shear pins.

References Cited by the Examiner
UNITED STATES PATENTS

| | | | |
|---|---|---|---|
| 2,285,099 | 6/1942 | Specht | 72—404 |
| 3,117,615 | 1/1964 | Graven | 72—404 |

RICHARD J. HERBST, *Primary Examiner.*

R. D. GREFE, *Assistant Examiner.*